April 17, 1945.   J. V. HORR   2,373,959
NAVIGATIONAL TRAINING AID
Filed May 10, 1944   2 Sheets-Sheet 1

INVENTOR
John V. Horr
BY
ATTORNEYS

April 17, 1945.  J. V. HORR  2,373,959
NAVIGATIONAL TRAINING AID
Filed May 10, 1944  2 Sheets-Sheet 2
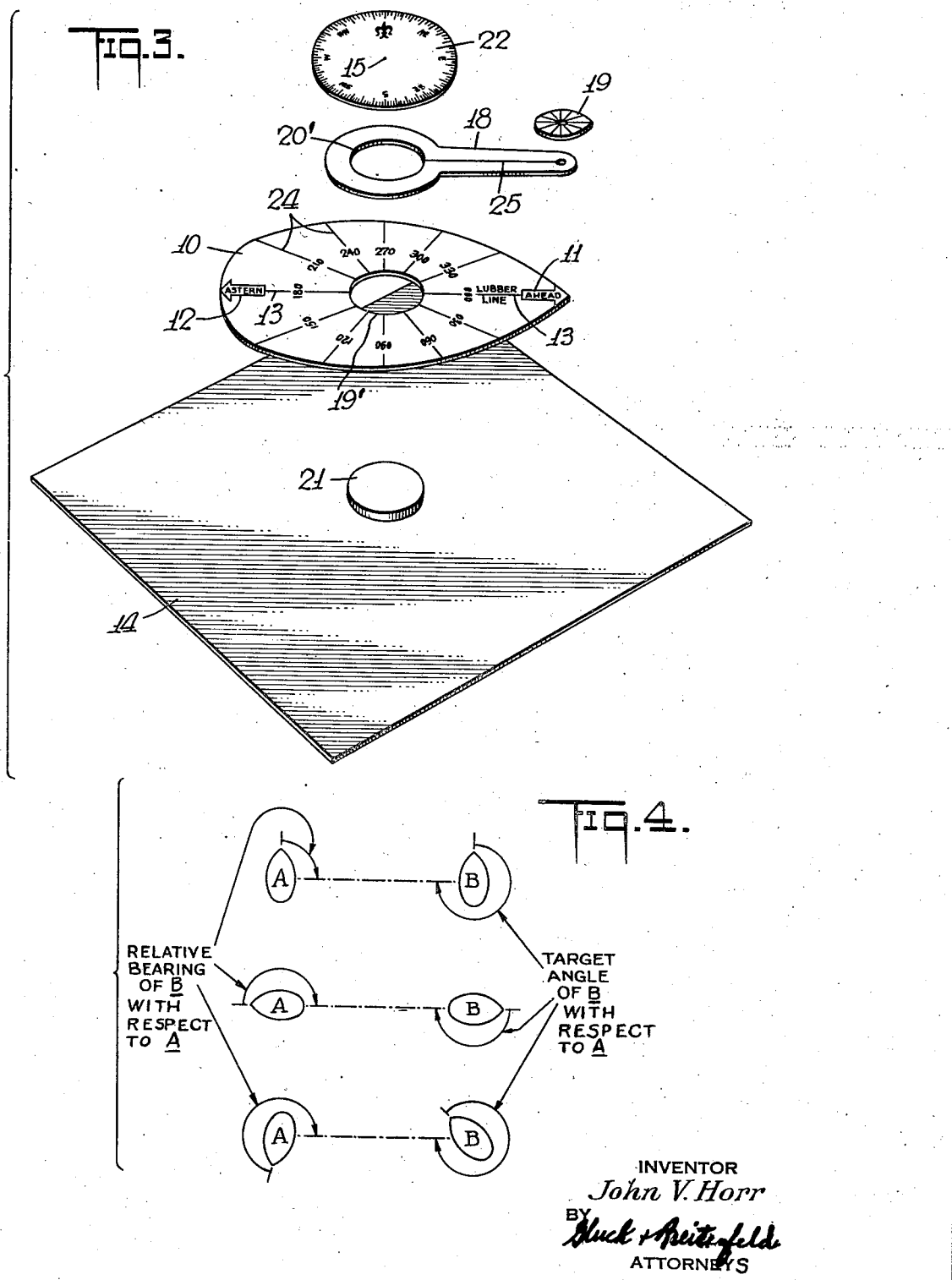

Patented Apr. 17, 1945

2,373,959

UNITED STATES PATENT OFFICE 2,373,959

NAVIGATIONAL TRAINING AID

John V. Horr, North Tarrytown, N. Y., assignor to Einson-Freeman Co., Inc., Long Island City, N. Y., a corporation of Delaware Application May 10, 1944, Serial No. 534,853

13 Claims. (Cl. 35—11)

My present invention relates generally to educational devices and has particular reference to a training aid intended to facilitate the teaching of certain phases of navigation.

A general object of the invention is to provide a device of simple and inexpensive structural character which lends itself readily to quantity manufacture at low cost, and which may be employed with striking effectiveness to teach those phases of the art of navigation which relate to so-called "relative bearing," "target angles," and similar relationships.

Briefly stated, the present device consists of a series of interengaged relatively movable elements, preferably composed of pieces of flat sheet material, with pivotal interconnections which permit various adjustments to depict the relative positions of a vessel and target with respect to each other and to a compass direction. The term "target" as used herein and in the parlance of navigation, especially in connection with the phrase "tarket angle," does ot necessarily allude to something which is aimed or fired at by means of a firearm, but includes within its significance any object, such as another vessel, with respect to which certain positional relationships are to be observed or studied. Accordingly, in the preferred embodiment of the present invention, one of the elements depicts a vessel while a second and relatively movable element is provided with a target representation in the form of a second vessel. The various parts are of simple structural shape and character, carrying certain markings and indicia which relate to the subject to be studied, and are preferably coupled with a relatively fixed element which depicts a compass rose.

I achieve the foregoing general objects, and such other objects as may hereinafter appear or be pointed out, in the manner illustratively exemplified in the accompanying drawings in which:

Figure 3 is an exploded view of the principal elements entering into the construction; and Figure 4 is a series of diagrams illustrating certain navigational relationships whose study is facilitated by means of the present device.

Preliminary reference to Figure 4 will facilitate an understanding of the nature and general mode of operation of the present device. Two vessels A and B are diagrammatically shown in three illustrative relationships, the relatively pointed end representing, in each case, the bow of the vessel, and the dot-and-dash line indicating the line of sight between them. The "relative bearing" of vessel B with respect to vessel A is the angle (in degrees) between the heading of vessel A and the line of sight between the vessels, measured in a clockwise direction. This "relative bearing" is, for example, approximately 90° in the first illustrative case, approximately 180° in the second case, and approximately 250° in the third case. The "target angle" of vessel B with respect to vessel A is the angle (in degrees) between the heading of vessel B and the line of sight between the vessels, also measured in a clockwise direction. This "target angle" is, for example, approximately 270° in the first illustrative case, approximately 180° in the second case, and approximately 315° in the third case. "Relative bearing" and "target angle" are thus observed to be relative terms; i. e., the "target angle" of B with respect to A is the "relative bearing" of A with respect to B, while the "relative bearing" of B with respect to A is the "target angle" of A with respect to B.

A full understanding of these terms, their significance, the various values which they may assume under different circumstances, and the relationships between them, can be acquired only by considerable study. To facilitate such study, and to develop in the student a familiarity with the subject, a device of the present character is highly effective, since it permits the student to adjust the parts of the device into a wide variety of different relationships and thereby enable him to produce for himself numerous graphic representations and relationships of vessel and target.

Figure 1:
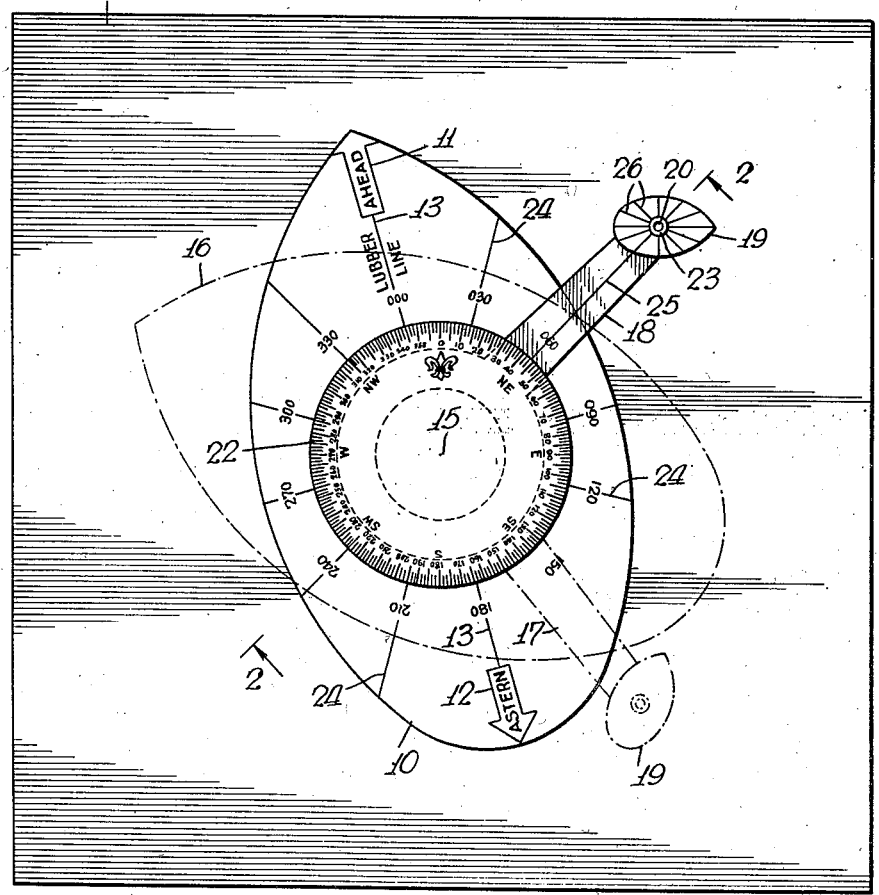
Figure 1 is a plan view of a training aid constructed in accordance with the present invention.
Figure 2:
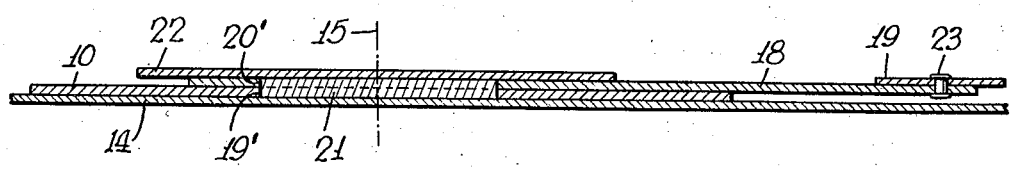
Figure 2 is an enlarged and slightly exaggerated cross-sectional view taken substantially along the line 2—2 of Figure 1.

The preferred structure illustrated in Figures 1, 2 and 3 is composed of relatively simple blanks or elements of flat sheet material such as cardboard. An element 10 is contoured to depict a vessel in plan view outline. Markings on its upper surface, as indicated at 11 and 12, are preferably employed to accentuate the bow and stern portions of the vessel. A marking 13 in the form of a straight line extends between the bow and the stern to depict what is known as the "lubber line" which coincides with the fore and aft or keel line of the ship.

The element 10 is mounted flatwise upon a backing element 14 so as to be rotatable in its own plane about a pivot axis 15 coinciding with a midportion of the lubber line 13. The dot-and-dash line 16 indicates the rotatability of the element 10 with respect to the backing 14, although it will be understood that the element 10 is freely rotatable in either direction through a complete arc of 360°.

Concentrically pivoted with respect to the element 10, and independently rotatable in a similar manner through a complete arc of 360° (as indicated by the dot-and-dash line 17), is an element 18 in the form of a radial arm. At its end this arm is provided with a target representation. In the preferred embodiment of the invention, this target representation assumes the form of a third element 19 which is pivoted to the arm 18 at 20 and which has a contour depicting a second vessel in plan view. The element 19 is freely rotatable in either direction through a complete arc of 360° with respect to the arm 18 on which it is mounted.

The manufacture and assembly of the parts may be conveniently achieved in the manner shown most clearly in Figure 3. The element 10 is provided with a central circular aperture 19' and the element 18 is provided with an enlarged inner portion defining a similar circular aperture 20'. Mounted on the backing 14 is a circular disk 21 which serves as a journal upon which the elements 10 and 18 may be mounted, in superposed relation, by fitting the openings 19' and 20' successively over the element 21. The latter element has a thickness approximately equal to the combined thicknesses of the apertured portions of the elements 10 and 18. The disk-shaped element 22, somewhat larger than the element 21, is then secured to the latter in concentric relationship thereto. The elements 14, 21 and 22 are thus permanently and immovably associated with one another, and may be deemed to be relatively fixed with respect to the relatively movable elements 10 and 18. Simple adhesive means may be employed to hold these fixed elements together, or a staple or other fastening instrumentality may be employed, if desired. The element 19 may be rotatably mounted on the end of the arm 18 in any similar or convenient manner, and I have illustratively shown a construction in which the element 19 is considerably smaller than the element 10 and is pivoted to the element 18 by means of an eyelet 23 (see Figure 2).

On its top surface, the element 22 carries circumferential indicia which define a compass rose, as shown most clearly in Figure 1. From the foregoing description, it will be understood that these markings or indicia are constantly fixed, positionally, with respect to the backing 14. This corresponds to the relatively fixed position which would be assumed by the magnetic element of an actual compass employed on an actual vessel corresponding to the element 10.

On the element 10, in addition to the base line 13, there are radial markings 24 arranged at selected different degrees from the lubber line 13. I have illustratively shown a series of radial lines at 30° intervals, with numerals associated therewith to designate their angular relationships, measured clockwise from the lubber line 13, i. e., from the direction of travel or "heading" of the vessel which the element 10 represents.

The arm element 18 carries indicia which I have shown in the form of a radial line 25, adapted to register with the compass rose indicia and with the markings on the element 10 as rotative adjustments of the arm 18 are affected relative to the compass rose element 22, and as relative rotative adjustments of the elements 10 and 18 are effected.

The elements 10 and 18 being in superposed relation, it may be desirable to make the upper element (in the illustrated form the element 18) of transparent material. If desired, the element 22 may also be of transparent material, and in general, any transparencies or apertures may be provided for, wherever better visibility of underlying parts or markings is facilitated thereby.

On the element 19 I provide a set of radial markings 26 similar to those on the element 10, these markings including a lubber line (the longitudinal marking which passes through the bow and stern portions of the element 19), and degree numerals or other explanatory markings may be employed if desired.

While the mode of use of the device is believed to have been clearly indicated by the foregoing description, it may be pointed out that the independent rotatability of the several parts, and the conjoint assembly of the parts in the manner shown, permits numerous different relationships to be tested and studied. For example, the registration of the lubber line 13 with the circumferential indicia on the compass rose element 22 permits a study of various "compass bearings" of the vessel which the element 10 represents. The similar registration of the line 25 with the compass rose indicia permits a study of various "compass bearings" of the target or vessel 19 with respect to the imaginary vessel on which the compass is mounted. The registration of the line 25 with the various radial markings on the element 10 permits a study of various "relative bearings" of the target with respect to the vessel 10. And the registration of the line 25 with the markings 26 on the element 19 permits a study of various "target angles" of the "vessel" 19 relative to the "vessel" 10.

In general, it will be understood that the details herein described and illustrated to explain the general nature of the invention may be modified by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is:

1. In a training aid, a pair of mutually pivoted elements adapted to be independently rotated in a plane perpendicular to the pivot axis, one of said elements depicting a vessel in plan view outline and provided with a lineal radial marking defining the lubber line of said vessel, the other element being an arm extending radially beyond said outline and provided at its end with a representation in plan view of a target, whereby different relative bearings may be studied by rotative adjustments of said arm relative to said lubber line, said elements being pieces of flat sheet material arranged in superposed relation.

2. In a training aid, a pair of mutually pivoted elements adapted to be independently rotated in a plane perpendicular to the pivot axis, one of said elements depicting a vessel in plan view and provided with a radial marking defining the lubber line of said vessel, the other element being an arm provided at its end with a representation of a target, said target representation comprising a third element pivoted to said arm and depicting another vessel in plan view, said depiction including a radial marking defining the lubber line of said other vessel, whereby different relative bearings and target angles may be studied by rotative adjustments of said arm relative to said lubber lines.

3. In a training aid, the structure set forth in claim 1, the upper one of said elements being transparent.

4. In a training aid, the structure set forth in claim 1, said first-named element having lineal radial markings at selected different degrees from said lubber line, and said arm having lineal radial indicia adapted to register with said markings as said adjustments are effected.

5. In a training aid, the structure set forth in claim 2, said elements being pieces of flat sheet material, the vessel elements being arranged in superposed relation to said arm.

6. In a training aid, the structure set forth in claim 2, each of said vessel elements having radial markings at selected different degrees from the corresponding lubber line, and said arm having radial indicia adapted to register with said markings as said adjustments are effected.

7. In a training aid, the structure set forth in claim 2, each of said vessel elements having radial markings at selected different degrees from the corresponding lubber line, and said arm having radial indicia adapted to register with said markings as said adjustments are effected, said elements being pieces of flat sheet material, the vessel elements being arranged in superposed relation to said arm.

8. In a training aid, a relatively fixed element depicting a compass rose, and a pair of elements concentrically pivoted thereto so as to be independently rotatable in a plane perpendicular to the pivot axis, one of said elements depicting a vessel in plan view and provided with a radial marking defining the lubber line of said vessel, the other element being an arm provided at its end with a representation in plan view of a target, whereby different compass bearings and relative bearings may be studied by rotative adjustments of said arm and vessel elements relative to each other and to said compass rose.

9. In a training aid, a relatively fixed element depicting a compass rose, and a pair of elements concentrically pivoted thereto so as to be independently rotatable in a plane perpendicular to the pivot axis, one of said elements depicting a vessel in plan view and provided with a radial marking defining the lubber line of said vessel, the other element being an arm provided at its end with a representation in plan view of a target, whereby different compass bearings and relative bearings may be studied by rotative adjustments of said arm and vessel elements relative to each other and to said compass rose, said elements being pieces of flat sheet material arranged in superposed relation.

10. In a training aid, a flat backing element, a flat element fixed thereon in slightly spaced superposed relation thereto and depicting a compass rose, and a pair of relatively movable flat elements mounted in said space and pivoted to said backing concentrically with respect to said compass rose so as to be independently rotatable in their own planes, one of said movable elements depicting a vessel in plan view and provided with a radial marking defining the lubber line of said vessel, the other movable element being an arm provided at its end with a representation in plan view of a target, whereby different compass bearings and relative bearings may be studied by rotative adjustments of said arm and vessel elements relative to each other and to said compass rose.

11. In a training aid, the structure set forth in claim 10, said vessel element having radial markings at selected different degrees from said lubber line, and said arm having radial indicia adapted to register with said markings as well as with said compass rose indicia as said adjustments are effected.

12. In a training aid, a flat backing element, a flat element fixed thereon in slightly spaced superposed relation thereto and depicting a compass rose, and a pair of relatively movable flat elements mounted in said space and pivoted to said backing concentrically with respect to said compass rose so as to be independently rotatable in their own planes, one of said movable elements depicting a vessel in plan view and provided with a radial marking defining the lubber line of said vessel, the other movable element being an arm provided at its end with a representation of a target, said target representation comprising a flat element pivoted to said arm and depicting another vessel in plan view, said depiction including a radial marking defining the lubber line of said other vessel, whereby different compass bearings, relative bearings, and target angles may be studied by rotative adjustments of said arm and vessel elements relative to one another and to said compass rose.

13. In a training aid, the structure set forth in claim 12, each of said vessel elements having radial markings at selected different degrees from the corresponding lubber line, and said arm having radial indicia adapted to register with said markings as well as with the compass rose indicia as said adjustments are effected.

JOHN V. HORR.